Jan. 11, 1944.  G. F. FERMIER  2,339,161
CONE BIT CONSTRUCTION
Filed July 21, 1942

George F. Fermier.
INVENTOR.

BY
ATTORNEYS

Patented Jan. 11, 1944

2,339,161

UNITED STATES PATENT OFFICE 2,339,161

CONE BIT CONSTRUCTION

George F. Fermier, Houston, Tex., assignor to Reed Roller Bit Company, Houston, Tex., a corporation of Texas Application July 21, 1942, Serial No. 451,688

6 Claims. (Cl. 308—9)

This invention relates to drill bits and has for its general object the provision of an improved bearing for a roller cutter forming a part of a drill bit.

It is well known that in the operation of drill bits of the type employing roller cutters, having sharp cutting teeth on their outer surfaces, the cutters are subjected not merely to stresses which are radial with respect to the axes of rotation of the cutters, but also at times to tremendous thrust stresses. Usually, these thrust stresses will alternate, but ordinarily the stresses in one direction will be far greater, both in amplitude and duration, to the thrust stresses in the opposite direction. For this reason, wear tends to take place against the thrust bearings to a greater extent in one direction than in the other. For this reason, it is quite customary in designing bearings for certain types of roller cutters, such as, for example, cutters for cone bits, to provide one thrust bearing capable of taking thrust in either direction and another thrust bearing capable of taking a much larger thrust in one direction only. In the cone bit, the second mentioned thrust bearing has, in the past, been provided on the end of the shaft which projects into the cutter, the end of the shaft and the end of the inside of the cutter being provided with hard surfacing to form a friction bearing.

However, difficulty has been encountered with such bearings because even though they are made to withstand great loads and resist wear, they will wear to some extent and when this wear takes place it permits end play of the cutter on its shaft.

It is, therefore, a more specific object of this invention to provide a self-adjusting thrust bearing for a roller cutter of a drill bit.

Another object of this invention is to provide a self-adjusting thrust bearing for taking the upward and outward thrust from the cone cutter of a cone bit.

Another object of this invention is to provide a thrust bearing for the purposes referred to which will at all times hold the cutter and prevent end play regardless of the degree of wear of the bearing.

Other objects and advantages of this invention will become apparent from the following description taken in connection with the accompanying drawing, in which is set forth by way of example one embodiment of the invention.

Figures 1, 2:
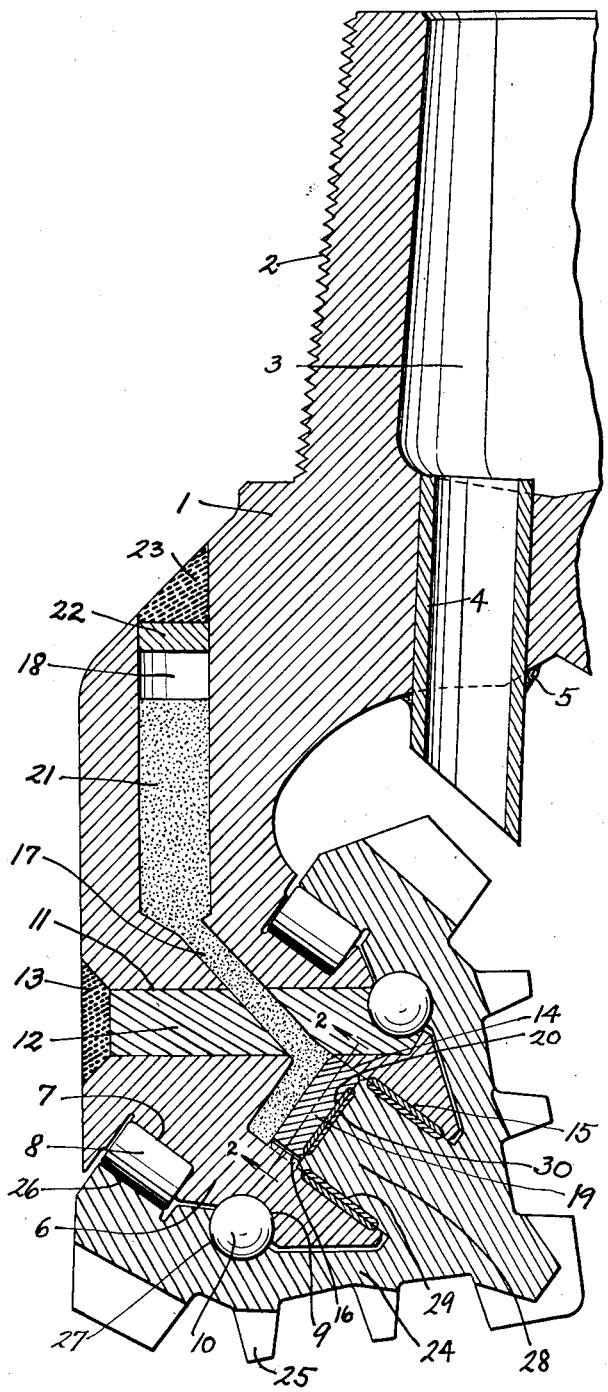
Figure 1 shows a fragmentary longitudinal cross-section through a cone bit and one of the cutters thereof and illustrates a bearing constructed in accordance with this invention.
Figure 2 shows a fragmentary cross-section through a portion of the bearing taken along the line 2—2 of Figure 1.

The body 1 of the drill bit illustrated is provided with a threaded shank portion 2 adapted to receive the drill collar or other connection at the lower end of a drill stem. This shank portion is preferably hollow, as indicated at 3, and is open at its upper end to receive drilling fluid from the drill stem. At its lower end this hollow section terminates in a horizontal wall perforated to receive tubular nozzle members 4 welded, or otherwise secured in place, as shown at 5.

At its lower end, the bit head or body 1 is provided with downwardly and inwardly extending cutter shafts 6, having a race-way 7 adapted to receive the cylindrical rollers 8 at a position remote from the end of the shaft. This shaft also has formed thereon a race-way 9 adapted to receive balls 10, this race-way being in a position between the race-way 7 and the end of the shaft.

In order that the balls 10 might be inserted into their race-way 9, there is provided a passage-way 11, leading from the outer surface of the bit head and extending diagonally through the shaft 6 to the uppermost portion of the race-way 9. After the balls are in place, this passage-way 11 is adapted to be closed by means of a plug 12, which is, in turn, welded in place as shown at 13.

The end of the shaft 6 is provided with a socket or bore 14, and a portion of the wall of this bore is provided with hard surfacing material as shown at 15 for a purpose presently to be discussed. Above this zone of hard surfacing material, the wall of this socket is provided with a key or spline 16, and leading upwardly from the upper end of the socket is a relatively small passage-way 17 communicating at its upper end with a reservoir 18, formed in the bit head. It will be seen that the passage-way 17 extends through the plug 12, the plug 12 being provided with a bore adapted, when the plug 12 is in place, to be aligned with that portion of the passage-way 17 which is in the bit head.

Mounted in the socket 14 for sliding movement inwardly or outwardly therein is a plunger-like member 19, having a hard surfacing material on its lower face, as shown at 20.

Filling the space behind this plunger-like member, and also filling the passage-way 17 and at least a portion of the reservoir 18, is a body of hard granular material 21. This material is preferably in the form of very irregularly shaped grains, such as would be formed for example by crushing a body of tungsten or tungsten carbide. Other materials, such as carborundum, might also be used for this purpose.

The upper end of the reservoir 18, after the body of granular material 21 is in place, is preferably closed by some suitable means, such as the plug 22 and the same secured in place by means of welding 23, or the like.

Placed over the end of the shaft 6 and adapted to rotate thereon is the roller cutter 24, which is of generally conical form and which has cutting teeth 25 formed on its exterior surface. This cutter has its interior formed with a race-way 26 adapted to receive the rollers 8, a race-way 27 adapted to receive the balls 10, and a projecting pin 28 adapted to extend into the socket 14. The pin 28 may, if desired, be secured in the hollow portion of the cutter by welding or the like after having been previously formed outside the cutter. In any event, however, it should be hard surfaced around its circumference, as indicated at 29, so as to cooperate with the hard surfacing 15 extending around the inside of the socket and provide additional radial bearing capacity for the cutter bearing. Likewise, the end of this pin 28 is preferably also provided with hard surfacing material adapted to cooperate with the hard surfacing material 20 to take a great portion of the upward and outward thrust from the cutter.

In operation, as heretofore noted, the cutter may be subjected to thrust first in one direction and then in the other, but the major portion of this thrust load is in an upward and outward direction. Now, whenever the thrust is in an inward and downward direction, the weight of the button 19 and of the granular material 21, which is behind the button, will tend to move the button downwardly into snug engagement with the end of the pin 28 so as to make up for any wear that may have occurred either on the button or on the pin 28, or both. It will also make up for any wear in the race-ways 9 and 27 and on the balls 10 which might permit the cutter to move downward and inwardly an excessive amount. As the button 19 moves downward, however, the space within the socket 14 behind this button will be filled with hard granular material flowing downwardly from the reservoir 18 and when a thrust in an upward and outward direction again occurs, this thrust will be transmitted to the button 19, but the button 19 cannot move upward because the space behind it is filled with granular material and the granular material will not flow out of this space and back into the reservoir 18, but will only pack tightly within the space behind the button.

Thus, it will be seen that each time the cutter is permitted to move downward and inward, the end of the pin 28 will be followed by the button 19 and the button 19 will be held in the lowest position which it may thus attain because the space behind the button will immediately become packed with hard granular material. The bearing will thus continually adjust itself to compensate for wear and excess end play of the cutter on its shaft will be definitely avoided.

Having described my invention, I claim:

1. A bearing construction comprising a shaft having a socket in one end, a roller member surrounding the shaft and having a part with a bearing surface thereon presented toward said socket, a piston element slidable in said socket and having a bearing surface opposed to the bearing surface carried by the roller, a body of loose granular material filling said socket, and means for maintaining a pressure head of granular material in communication with the material in said socket.

2. A bearing construction comprising a shaft having a socket in one end, a roller member surrounding a shaft and having a part projecting into said socket and provided with a thrust bearing surface thereon presented toward the interior of said socket, a piston-like element in said socket and keyed to the wall thereof to permit it to slide longitudinally within said socket but prevent its rotation therein, said piston-like element having a thrust bearing surface opposed to the thrust bearing surface carried by said roller, a reservoir communicating with said socket and located at an elevation above said socket, and a body of loose granular material filling said socket behind said piston-like element and at least partly filling said reservoir.

3. A bearing construction comprising a shaft having a socket in one end, a roller member surrounding the shaft and having a part with a bearing surface thereon presented toward said socket, a piston element slidable in said socket and having a bearing surface opposed to the bearing surface carried by the roller, a body of loose crushed hard material filling said socket behind said piston-like element, and means for maintaining a pressure head on said material.

4. A bearing construction comprising a shaft having a socket in one end, a roller member surrounding the shaft and having a part with a bearing surface thereon presented toward said socket, a piston element slidable in said socket and having a bearing surface opposed to the bearing surface carried by the roller, a body of loose crushed tungsten carbide filling said socket behind said piston-like element, and means for maintaining a pressure head on said material.

5. A bearing construction comprising a shaft having a socket in one end, a roller member surrounding the shaft and having a part with a bearing surface thereon presented toward said socket, a piston element slidable in said socket and having a bearing surface opposed to the bearing surface carried by the roller, a body of loose crushed tungsten filling said socket behind said piston-like element, and means for maintaining a pressure head on said material.

6. A bearing construction comprising a shaft having a socket in one end, a roller member surrounding the shaft and having a part with a bearing surface thereon presented toward said socket, a piston element slidable in said socket and having a bearing surface opposed to the bearing surface carried by the roller, a body of loose crushed carborundum filling said socket behind said piston-like element, and means for maintaining a pressure head on said material.

GEORGE F. FERMIER.